United States Patent
Kim et al.

(10) Patent No.: US 12,124,058 B2
(45) Date of Patent: Oct. 22, 2024

(54) CYLINDRICAL SPATIAL IMAGE PROJECTION DEVICE USING HALF MIRROR

(71) Applicant: KT CORPORATION, Seongnam-si (KR)

(72) Inventors: Seung Cheol Kim, Seoul (KR); Jong Heum Kim, Seongnam-si (KR); Tae Gil Yang, Seoul (KR); Sang Hoon Han, Gwangmyeong-si (KR)

(73) Assignee: KT CORPORATION, Gyeonggi-Do (KR)

( * ) Notice: Subject to any disclaimer, the term of this patent is extended or adjusted under 35 U.S.C. 154(b) by 274 days.

(21) Appl. No.: 17/207,099

(22) Filed: Mar. 19, 2021

(65) Prior Publication Data

US 2021/0208420 A1    Jul. 8, 2021

Related U.S. Application Data

(63) Continuation of application No. PCT/KR2019/012088, filed on Sep. 18, 2019.

(30) Foreign Application Priority Data

Sep. 19, 2018  (KR) .................. 10-2018-0112102

(51) Int. Cl.
*G02B 27/14* (2006.01)
*G02B 30/50* (2020.01)

(52) U.S. Cl.
CPC ........... *G02B 30/50* (2020.01); *G02B 27/144* (2013.01)

(58) Field of Classification Search
CPC ...... G02B 30/50; G02B 27/144; G02B 30/40; G03H 1/04

USPC .......................................... 359/465
See application file for complete search history.

(56) References Cited

U.S. PATENT DOCUMENTS

| 10,310,284 | B1 * | 6/2019 | Waldron | H04N 13/398 |
| 2002/0174580 | A1 * | 11/2002 | Ericson | G09F 19/14 |
| | | | | 40/453 |
| 2012/0147465 | A1 * | 6/2012 | Ruhle | G02B 27/286 |
| | | | | 359/465 |
| 2018/0120563 | A1 | 5/2018 | Kollin et al. | |

FOREIGN PATENT DOCUMENTS

| JP | 2017-028692 A | 2/2017 |
| KR | 10-2002-0072428 A | 9/2002 |
| KR | 10-2013-0000310 A | 1/2013 |
| KR | 10-1523712 B1 | 5/2015 |
| KR | 10-1600239 B1 | 3/2016 |
| KR | 10-2016-0113783 A | 10/2016 |

(Continued)

OTHER PUBLICATIONS

International Search Report of PCT/KR2019/012088, dated Jan. 7, 2020.

*Primary Examiner* — Audrey Y Chang
(74) *Attorney, Agent, or Firm* — HSML P. C.

(57) ABSTRACT

A spatial image projection device includes a housing, a display unit that is accommodated in the housing and configured to output a hologram image, a half-mirror configured to project a spatial image corresponding to the hologram image inside the housing, and a first polarizing film that is disposed outside the housing and configured to block a part of light directed toward a viewer from the housing.

5 Claims, 10 Drawing Sheets (56) References Cited

FOREIGN PATENT DOCUMENTS

| KR | 10-2016-0121350 A | 10/2016 |
| KR | 10-1691298 B1 | 12/2016 |
| KR | 10-2018-0025107 A | 3/2018 |
| KR | 10-2018-0032317 A | 3/2018 |
| KR | 10-2018-0070154 A | 6/2018 |
| KR | 10-2018-0076541 A | 7/2018 |

* cited by examiner

FIG. 7

CYLINDRICAL SPATIAL IMAGE PROJECTION DEVICE USING HALF MIRROR

TECHNICAL FIELD

The present disclosure relates to a cylindrical spatial image projection device using a half mirror.

BACKGROUND

Three-dimensional (3D) stereoscopic image display refers to a technique of adding depth information to a two-dimensional (2D) image; and, using this depth information, enabling a viewer to feel a sense of 3D vividness and reality.

A stereoscopic image display device can be operated by incorporating methods pertaining to the binocular disparity of human eyes and hologram and volumetric 3D display methods to implement a stereoscopic method.

Hologram and volumetric 3D display methods implement stereoscopic images freely in a space.

As a representative example, a hologram spatial image projection device is operated by using a reflective pseudo hologram technique known as "Pepper's ghost," which refers to a technique for enabling the viewer to view transmitted light of a rear surface of a material and reflected light of a front surface of the material at the same time. The technique further causes an image that appears on the front surface of the material and also appear on a background and in a space there between. This technique produces an effect by which objects (images) appear to float in a space, and thus is also called "floating hologram".

Recently, a device capable of displaying a hologram character in a space using a floating hologram technique has been developed. Such a device enables implementation of methods of displaying real images in a real space by using a concave mirror, a convex lens, a micro mirror array, and the like; displaying virtual images in a real space by using a half mirror, a prism array, and the like; and displaying images on the surface of a screen by using a transparent screen, a Sharkstooth scrim screen, and the like and displaying the images in a space.

The method of displaying real images enables images to be directly touched by projecting the images in a real space. Meanwhile, the method of displaying virtual images by using a half mirror provides a wide viewing zone and a constant image size. The method using a transparent screen or a Sharkstooth scrim screen provides a feeling like images are formed on a space by projecting images on the transparent screen.

DISCLOSURE

Problems Solved

The present disclosure is directed towards providing a hologram image and a spatial image with improved quality and visibility by using the polarization characteristics of light to remove noise other than the images to be output.

For example, the examples described and recited herein provide solutions for projecting extended vertical images while also maintaining a size and/or integrity of the dimensions of the image; projecting extended vertical images utilizing a system that does not sacrifice image quality in return for a relatively compact system size; projecting extended vertical images using a transparent screen, a Sharkstooth scrim screen, etc., in a compact manner without sacrificing image sharpness; and projecting extended vertical images utilizing a transparent screen projector, without sacrificing image sharpness or requiring a larger system.

Problems to be solved by apparatuses, systems, and methods described and recited in the present disclosure are not limited to the above-described problems. There may be other problems to be solved by the present disclosure.

Aspects

A first aspect of the present disclosure provides a spatial image projection device, including: a housing; a display unit that is accommodated in the housing and configured to output a hologram image; a half mirror configured to project a spatial image corresponding to the hologram image inside the housing; and a first polarizing film that is disposed outside the housing and configured to block a part of light directed toward a viewer from the housing.

A second aspect of the present disclosure provides a spatial image projection device, including: a housing; a display unit that is accommodated in the housing and configured to output a hologram image; a reflective polarizing film configured to project a spatial image corresponding to the hologram image inside the housing; and a polarizing film that is disposed outside the housing and configured to block a part of light directed toward a viewer from the housing.

Effects

Described and/or recited herein are embodiments that may provide a hologram image and a spatial image with improved quality and visibility using polarization characteristics of light to remove noise other than the images to be output.

Also described and/or recited herein is a mirror that reflects an external environment and transmits an output image disposed inside a semi-cylindrical structure. Thus, the semi-cylindrical structure may be seen as a cylindrical structure and a hologram image may be output to the inside of the structure that is seen as a cylindrical structure.

BEST MODE

Hereinafter, embodiments of the present disclosure will be described in detail with reference to the accompanying drawings so that the present disclosure may be readily implemented by a person having ordinary skill in the art. However, it is to be noted that the present disclosure is not limited to the embodiments described and recited herein, but may also be embodied in various other ways. In the accompanying drawings, parts that do not directly pertain to the embodiments may be omitted for the simplicity of explanation, and like reference numerals denote like parts through the whole document.

Throughout the entire disclosure, the phrase "connected to" or "coupled to" that is used to designate a connection or coupling of one element to another element applies to both when an element is "directly connected or coupled to" another element and when an element is "electronically connected or coupled to" another element via still another element. Further, throughout the entire disclosure, the phrases "comprises or includes" and/or "comprising or including" may imply that one or more other components, steps, operations and/or the existence or addition of elements are not excluded in addition to the described components, steps, operations and/or elements unless context dictates otherwise.

Throughout the entire disclosure, the term "unit" may refer to any of a unit implemented by hardware, a unit or component implemented by software, and a unit implemented by both, e.g., firmware. One unit may be implemented by two or more pieces of hardware, and two or more units may be implemented by one component of hardware.

Throughout the entire disclosure, a part of an operation or function described as being carried out by a terminal or device may additionally or alternatively be carried out by a server connected to the terminal or device. Likewise, a part of an operation or function described as being carried out by a server may additionally or alternatively be carried out by a terminal or device connected to the server.

Hereinafter, the present disclosure will be explained in detail with reference to the accompanying figures.

Figure 1:
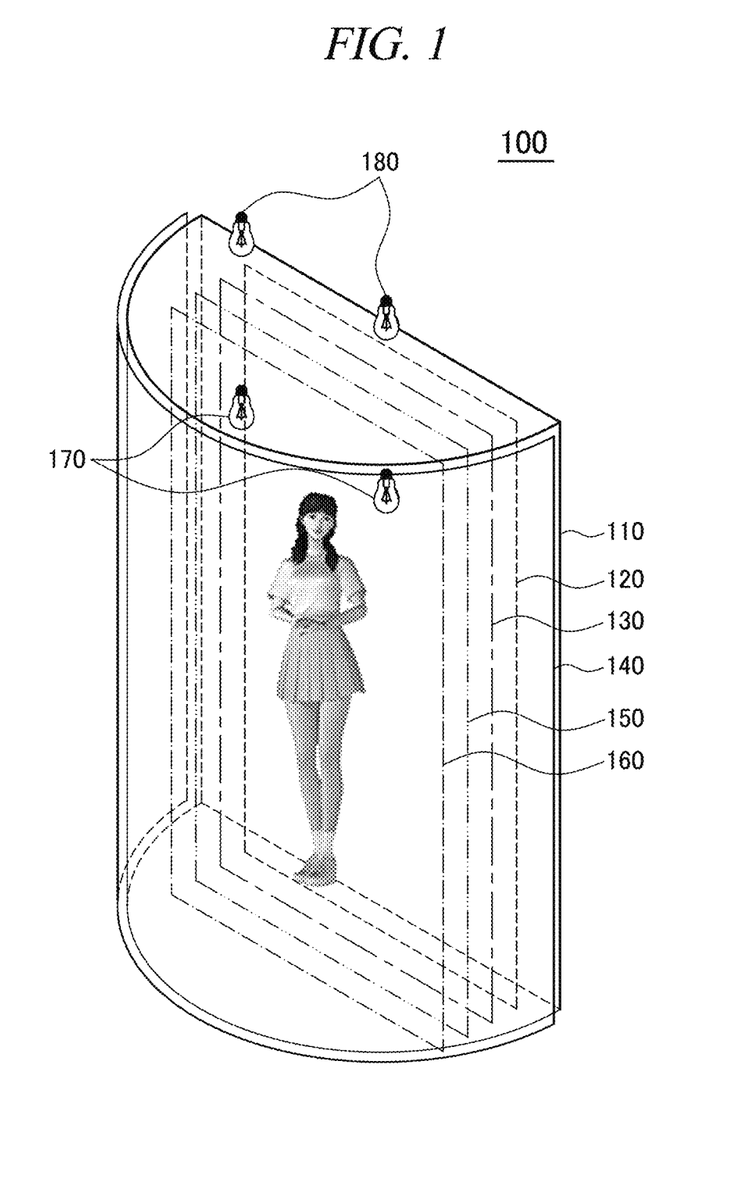
FIG. 1 is a perspective view of a spatial image projection device in accordance with at least one embodiment of the present disclosure.
Figure 2:
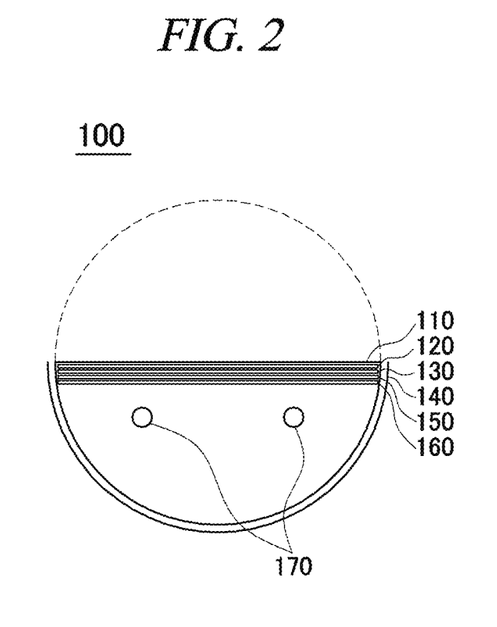
FIG. 2 is a cross-sectional view of the spatial image projection device in accordance with at least one embodiment of the present disclosure.

FIG. 1 is a perspective view of a spatial image projection device 100 in accordance with an embodiment of the present disclosure, and FIG. 2 is a cross-sectional view of the spatial image projection device 100 in accordance with the embodiment of the present disclosure.

Referring to FIG. 1, a hologram image of a character is output to the interior of semi-cylindrical housing 110 and therefore may be regarded as a diagram of an implementation of the spatial image projection device 100 according to at least one embodiment of the present disclosure. The embodiments described and recited in the present disclosure are not limited thereto.

Referring to FIG. 1 and FIG. 2, the spatial image projection device 100 may include a housing 110, a display unit 120, a half-mirror 130, and a first polarizing film 140. In addition, the spatial image projection device 100 may 0further include a second polarizing film 150, a quarter wave plate 160, and an illumination device 170.

The housing 110 may be formed into a semi-cylindrical shape to have a space, i.e., inner space or interior, therein. Embodiments of the housing 110 are not limited to being semi-cylindrical in shape, but may alternatively have a cylindrical or poly-prism shape.

The display unit 120 and the half-mirror 130 may be disposed in the inner space of the housing 110. Further, the first polarizing film 140 may be disposed on a curved surface of the semi-cylindrical housing 110. Furthermore, the second polarizing film 150, the quarter wave plate 160, and the illumination device 170 may be further disposed inside the housing 110.

In accordance with at least one embodiment described and recited herein, the housing 110 may be made of a transparent material that transmits light, but the embodiments are not so limited.

The display unit 120 is disposed inside the housing 110, and may be disposed to output a hologram image toward a curved surface of the housing 110.

In accordance with at least one embodiment described and recited herein, the display unit 120 may output a hologram image having a black background, but the embodiments are not so limited. With regard to the present embodiment, since the background other than the hologram image is processed in black, the visibility of the hologram image may be improved.

The display unit 120 is a display panel and may include a liquid crystal display (LCD), an organic light emitting diode (OLED), a quantum dot display, and a projection display.

Also, the display unit 120 may be a display panel capable of outputting a polarized glass-type stereoscopic image or a shutter-glass type stereoscopic image.

Further, the display unit 120 may be a display panel capable of outputting a parallax barrier type stereoscopic image or a lenticular lens type glass-free stereoscopic image.

Furthermore, the display unit 120 may be a display panel capable of outputting a complete stereoscopic image, such as an integral image, a volumetric display and a hologram display.

The half-mirror 130 may be located on the front of the display unit 120 to project a spatial image corresponding to the hologram image output from the display unit 120 according to the ratio of transmittance and reflectance.

More specifically, the housing 110 having a semi-cylindrical curved surface and made of a transparent material may be located in front of the half-mirror 130. Accordingly, a reflection image of the semi-cylindrical curved surface of the housing 110 may be formed on the half-mirror 130, and, thus, the housing 110 may be seen as having a cylindrical shape due to the semi-cylindrical curved surface of the housing 110 together with the reflection image thereof. That is, the half-mirror 130 may project a cylindrical spatial image to the inner space of the housing 110.

Further, the half-mirror 130 may obscure a bezel of the display unit 120 depending on the ratio of transmittance and reflectance and thus improve the hologram effect.

The first polarizing film 140 may be disposed outside of the housing 110, e.g., attached to an outer surface of the housing 110. The first polarizing film 140 may block, at least partially, light rays directed to a viewer of the hologram through the housing 110. Accordingly, the first polarizing film 140 may remove noise other than a hologram image output from the display unit 120 and a spatial image projected from the half-mirror 130 or noise generated from the hologram image and the spatial image. As described, recited and referenced herein, the noise may be regarded as surrounding environment reflection images that are projected as images from an external environment enter the housing 110 and are projected from the half-mirror 130; and the noise may also refer to a floating noise projected by reflecting the spatial image from the half-mirror 130.

The first polarizing film 140 may be any one of a circular polarizing film and a linear polarizing film, but embodiments thereof are not so limited. With regard to the present embodiment, the first polarizing film 140 may be selected from any of a circular polarizing film and a linear polarizing film based on the polarization characteristics of light.

Further, the first polarizing film 140 may be either a left-circular polarizing film or a right-circular polarizing film, but embodiments of the polarizing film 140 described and recited herein are not limited thereto.

The second polarizing film 150 is disposed on the front of the display unit 120 to block, at least partially, light rays output from the display unit 120. Also, the second polarizing film 150 may be disposed on the front of the half-mirror 130 to block, at least partially, light rays reflected from the half-mirror 130. Accordingly, the second polarizing film 150 may remove noise other than a hologram image output from the display unit 120 and a spatial image projected from the half-mirror 130 or noise generated from the hologram image and the spatial image.

The second polarizing film 150 may be any one of a linear polarizing film and a circular polarizing film, but the embodiments described and recited herein are not so limited.

The quarter wave plate 160 may change a polarization component. The quarter wave plate 160 may generate a phase difference between the components of the two directions of light e.g., P wave and S wave, and convert a light having a vertical polarization component to a light having a circular polarization and convert the light having a circular polarization to the light having a vertical polarization component. In accordance with the present embodiment, vertical polarization and circular polarization are converted so that only necessary images are displayed.

The quarter wave plate 160 according to the embodiment of the present disclosure may be disposed to overlap the first polarizing film 140. Further, the quarter wave plate 160 may be disposed on the front of the second polarizing film 150.

The illumination device 170 is disposed inside the housing 110 and may irradiate light within the housing 110.

The illumination device 170, disposed inside the housing 110, may allow light to be scattered inside the housing 110. For example, some of the light is directed toward the bottom and the semi-cylindrical curved surface of the housing 110 and collides the bottom and the semi-cylindrical curved surface of the housing 110; as a result, the part of the light is scattered. With regard to the present embodiment, a light scattered from the semi-cylindrical curved surface of the housing 110 is reflected from the half-mirror 130 and directed toward the outside of the housing 110. Accordingly, the viewer may see a cylindrical spatial image formed by a combination of the real semi-cylindrical curved surface and the semi-cylindrical curved surface reflected on the half-mirror 130. With regard to the present embodiment, the illumination device 170 is not limited to allowing light to be scattered from the bottom and the semi-cylindrical curved surface of the housing 110, as described above. For example, the illumination device 170 may be disposed not only on the ceiling portion of the housing 110, but also on the bottom portion. In this case, the illumination device 170 may allow light to be scattered from the ceiling portion of the housing 110.

However, it is to be noted that the above description of the present embodiment of the present disclosure is not intended to limit, in any way, to the aforementioned locations and the functions of the display unit 120, the half-mirror 130, the first polarizing film 140, the second polarizing film 150, the quarter wave plate 160, and the illumination device 170.

Figure 3A:
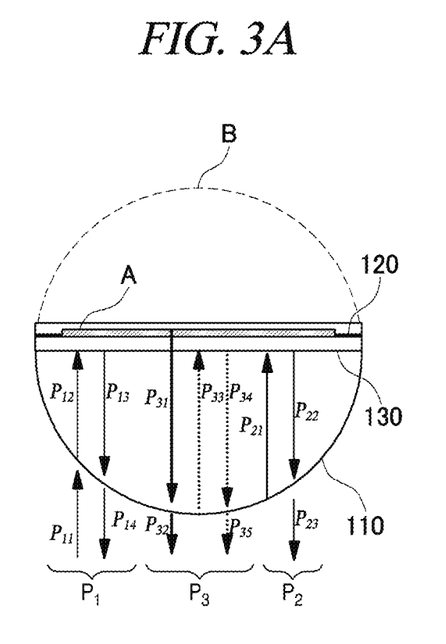
FIG. 3A is a cross-sectional view of a spatial image projection device in accordance with at least one embodiment of the present disclosure.
Figure 3B:
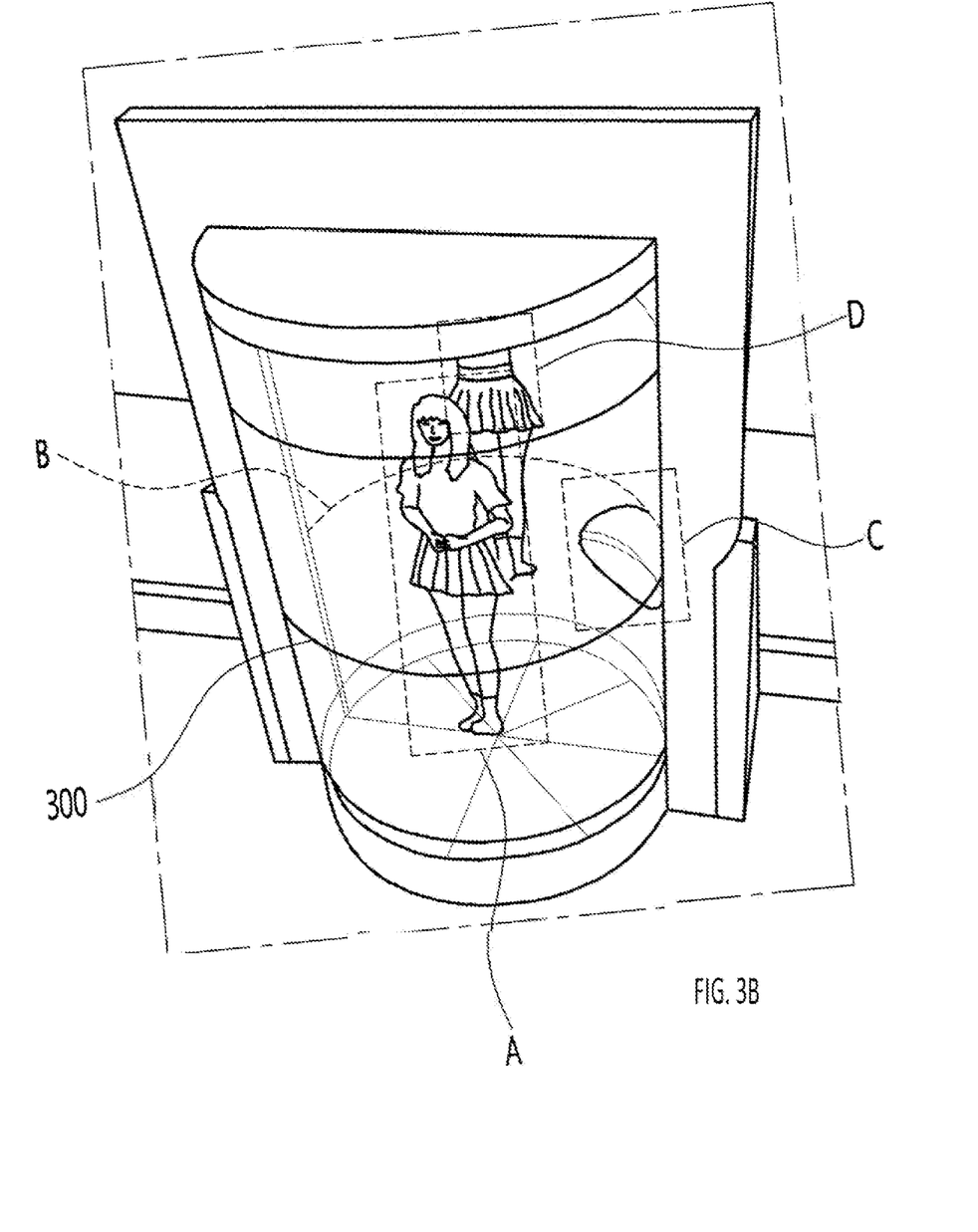
FIG. 3B is a perspective view of the spatial image projection device in accordance with at least one embodiment of the present disclosure.

FIG. 3A is a cross-sectional view of a spatial image projection device in accordance with at least one embodiment of the present disclosure, and FIG. 3B is a perspective view of the spatial image projection device in accordance with at least one embodiment of the present disclosure.

Specifically, FIG. 3A shows the cylindrical spatial image projection device 100 using the half-mirror 130 as viewed from above, and FIG. 3B shows an implementation of the cylindrical spatial image projection device according to the non-limiting example embodiment described with reference to FIG. 3A.

Referring to FIG. 3A, as described above, the display unit 120 and the half-mirror 130 may be disposed inside the housing 110. Further, the half-mirror 130 may be located towards the front, i.e., towards a viewer of the hologram, of the display unit 120, and the curved surface of the semi-cylindrical housing 110 may be located in front of the half-mirror 130.

A viewer may view an image from a hologram image A output from the display unit 120 and passing through the half-mirror 130 and the housing 110. At the same time, the viewer may view an image of the semi-cylindrical housing 110 reflected on the half-mirror 130. With regard to the present embodiment, two parts of an inner surface of the semi-cylindrical housing 110 may surround both sides of the half-mirror 130. That is, the two parts of an inner surface of the semi-cylindrical housing 110 may be in contact with the both sides of the half-mirror 130. Accordingly, the viewer may perceive the housing 110 and its reflected image as being a cylinder. That is, the viewer may view a transparent cylindrical spatial image B projected from the half-mirror 130 and a hologram image output from the display 120 and projected in the center of the spatial image B. In accordance with the present embodiment, a no-image area and the bezel, except for the hologram image A output from the display unit 120, may be processed in black. Therefore, the viewer may see through the half-mirror 130 as if nothing but the hologram image A exists.

Referring to FIG. 3B together, the half-mirror 130 is located inside the semi-cylindrical housing 110, and the display unit 120 is located on the back of the half-mirror 130 as shown in FIG. 3A. Further, a line 300 of a specific color (for example, black) is formed on the curved surface of the housing 110, and the line 300 is reflected from the half-mirror 130 and seen as being connected to the back of the half-mirror 130. That is, by displaying the line of a specific color on the curved surface of the housing 110, the semi-cylindrical housing 110 appears to be cylindrical to the viewer.

Referring back to FIG. 1, when the inside or outside of the curved surface of the housing 110 is scratched in a line or a specific shape and the external illumination device 180 is provided on the upper side or the lower side of the housing 110, light from the external illumination device 180 is guided to descend or ascend along the housing 110 and scatters where the housing is scratched and thus shines brightly. The shining linear shape may be reflected on the half-mirror 130 and appear to the viewer to be connected to the back of the half-mirror 130. That is, by displaying the line of a specific color on the curved surface of the housing 110, the semi-cylindrical housing 110 appears to the viewer to be cylindrical.

In accordance with at least some embodiments described and recited herein, the cylindrical spatial image projection device 100 using the half-mirror 130 causes the semi-cylindrical housing 110 to appear to be cylindrical to a viewer by using at least one of the illumination device 170 provided inside the housing 110 and an external illumination device 180 provided outside the housing 110 (see FIG. 1). With regard to the present embodiment, the illumination device 170 (see FIG. 1) or the external illumination device 180 may be provided on either an upper side or a lower side of the housing 110, but the embodiments described and recited herein are not so limited.

At least one led light bar of a predetermined pattern may be formed on a bottom portion of the housing 110. In accordance with the at least one embodiment, the least one led light bar of the predetermined pattern may be reflected on the half-mirror 130 to create a virtual image of the pattern so that a three-dimensional effect is enhanced. Here, the predetermined pattern may be lines passing through the center of the bottom as shown in FIG. 3B or a semicircular shape formed along the edge of the bottom. That is, the predetermined pattern may be reflected on the half-mirror 130 to project a circular shape or the semicircular shape so that the viewer may not recognize the half-mirror 130, and therefore the three-dimensional effect is enhanced.

This pattern may be reflected on the half-mirror 130 and thus be symmetrical in form. Accordingly, it is possible to improve the effect of making the housing 110 appear to the viewer to be cylindrical.

Also, referring to FIG. 3B, the viewer may see noise images C and D. The surrounding environment reflection image C in FIG. 3B shows that the environment in front of the implemented spatial image projection device 100 may be reflected on the half-mirror 130 and overlap the hologram image A and thus reduce the visibility of the hologram image A to the viewer. Further, the floating noise D is an image from the hologram image A output from the display unit 120, reflected inside the housing 110 and then reflected again from the half-mirror 130 and projected onto the spatial image B. The floating noise D also overlaps the hologram image A and thus reduces the hologram effect.

Referring to FIG. 3A, the paths of light in the proposed spatial image projection device 100 is largely divided into three types.

A first path $P_1$ is a path along which light $P_{11}$ of the external environment passes through the housing 110, enters into the housing 110 $P_{12}$ to be reflected from the half-mirror 130 $P_{13}$, and exit from the housing 110 $P_{14}$. The surrounding environment reflection image C may be projected by light traveling along the path $P_1$.

A second path $P_2$ is a path along which light from the illumination device 170 (see FIG. 1) disposed inside the housing 110 is reflected/scattered from the housing 110 or the bottom portion of the housing 110 $P_{21}$, and is reflected from the half-mirror 130 $P_{22}$, and then exits the housing 110 $P_{23}$. The housing 110 may be reflected on the half-mirror 130 by light irradiated from the illumination device 170 (see FIG. 1), and the cylindrical spatial image B may be projected.

A third path $P_3$ is a path along which light output from the display unit 120 passes through the half-mirror 130 $P_{31}$ and penetrates and exits the housing 110 $P_{32}$. The hologram image A may be projected by light traveling along this path.

With regard to the present embodiment, at least a portion of the light is reflected on the curved surface of the housing 110 $P_{33}$ and is directed again to the half-mirror 130. The light is reflected again from the half-mirror 130 $P_{34}$ and passes through and exits the housing 110 $P_{35}$. Based on path $P_3$, an image output from the display unit 120 is reflected and gathered inside the housing 110, and may be projected onto the spatial image B. The projected image is reflected from the half-mirror 130 and generates floating noise D.

Figure 4A:
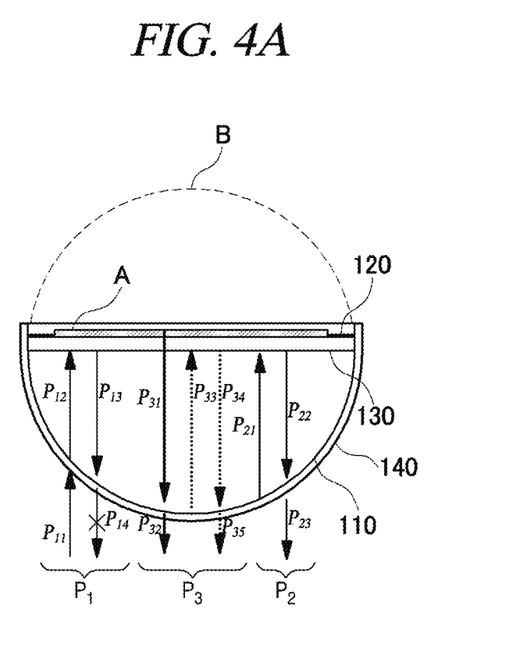
FIG. 4A is a cross-sectional view of a spatial image projection device in accordance with at least one embodiment of the present disclosure.
Figure 4B:
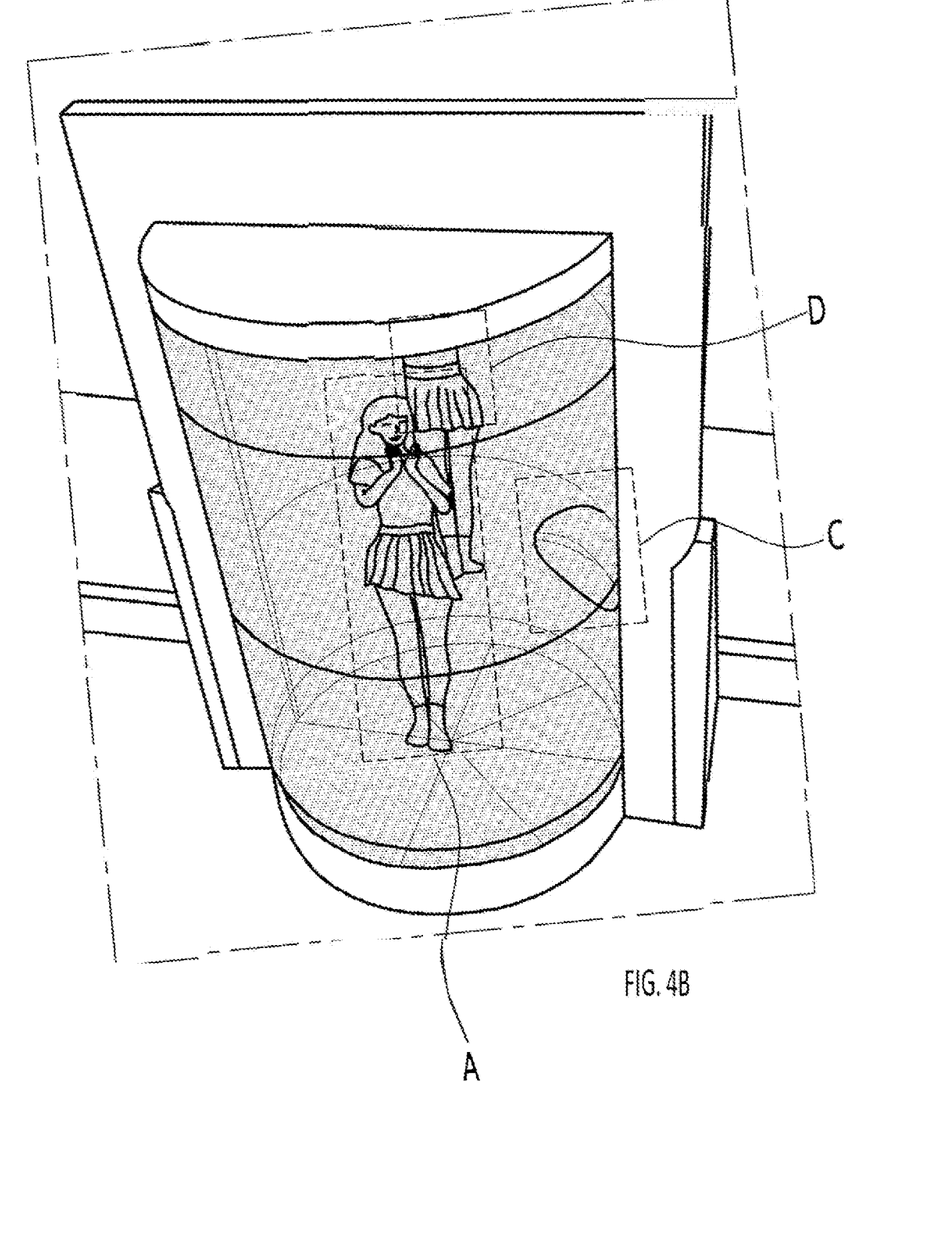
FIG. 4B is a perspective view of the spatial image projection device in accordance with at least one embodiment of the present disclosure.

FIG. 4A is a cross-sectional view of a spatial image projection device in accordance with at least one other embodiment of the present disclosure, and FIG. 4B is a perspective view of the spatial image projection device in accordance with the at least one other embodiment of the present disclosure.

Referring to FIG. 4A and FIG. 4B, the first polarizing film 140 is attached to the outside of the housing 110 as shown in FIG. 4A to remove noise C of FIG. 4B. Here, the first polarizing film 140 may be either a left-circular polarizing film or a right-circular polarizing film. With regard to the present embodiment, the first polarizing film 140 may be composed of a linear polarizing film and a quarter wave plate, although the embodiments described and recited herein are not so limited.

The paths of light in the spatial image projection device 100 and the polarization characteristics thereof are described as follows. With regard to the present embodiment, the first polarizing film 140 is a left-circular polarizing film, for example. Further, with regard to the present non-limiting example embodiment, the first polarizing film 140 is composed of a linear polarizing film and the quarter wave plate 160 (see FIG. 1).

A first path $P_1$ is a path along which light $P_{11}$ of the external environment passes through the housing 110, enters into the housing 110 $P_{12}$, is reflected from the half-mirror 130 $P_{13}$, and then exits from the housing 110 $P_{14}$. The light $P_{11}$ of the external environment is unpolarized light and has only a vertical polarization component while passing through the linear polarizing film portion of the first polarizing film 140 attached to the housing 110, and is converted into a left-circular polarization component whiling passing through the quarter wave plate 160 (see FIG. 1), and then enters into the housing 110 $P_{12}$. The light may be reflected from the half-mirror 130 $P_{13}$ and passes through the curved surface of the housing 110, where the light is converted into a right-circular polarization component, and is directed toward the first polarizing film 140. The light is converted into a horizontal polarization component while passing through the quarter wave plate 160 (see FIG. 1) of the first polarizing film 140. The light is perpendicular to the linear polarizing film of the first polarizing film 140 and cannot pass through. Therefore, the light cannot C may be removed. The housing 110 may be made of a material, e.g., glass or acrylic, that does not change the polarization characteristics, but embodiments thereof are not so limited.

A second path $P_2$ is a path along which light from the illumination device 170 (see FIG. 1) disposed inside the housing 110 is reflected/scattered inside the housing 110 $P_{21}$ and reflected from the half-mirror 130 $P_{22}$ and then exits from the housing 110 $P_{23}$. If the illumination device 170 (see FIG. 1) does not have a special polarization direction, the light $P_{21}$ reflected/scattered from the housing 110 and the light $P_{22}$ reflected from the half-mirror 130 are also unpolarized lights. The unpolarized light passes through the housing 110 and the linear polarizing film, and then the vertically polarized light comes out $P_{23}$. That is, since the shape of the housing 110 is reflected from the half-mirror 130 outward from the housing 110, the viewer may see the cylindrical spatial image B of the housing 110 formed by combination of the real semi-cylindrical curved surface with the semi-cylindrical curved surface reflected on the half-mirror 130.

In accordance with at least some embodiments described and recited herein, the display unit 120 is located behind the half-mirror 130. A third path $P_3$ is a path along which an image output from the display unit 120 passes through the half-mirror 130 $P_{31}$ and is directed toward the curved surface of the housing 110; and, if the polarization characteristics of the image output from the display unit 120 do not correspond to left-circular polarization, the image passes through the housing 110 and the first polarizing film 140 P32 and then exits the housing 110. Therefore, the viewer may see the hologram image A. With regard to the present embodiment, a part of the light is reflected inside the housing 110 $P_{33}$ and directed again to the half-mirror 130 while maintaining the polarization state. The light is reflected again from the half-mirror 130 $P_{34}$ while maintaining the polarization state and passes through the curved surface of the housing 110 and exits $P_{35}$.

As a result, the cylindrical spatial image B may be seen as it is while the surrounding environment reflection image C reflecting the external environment is removed. That is, the viewer may see the hologram image A and the spatial image B where the surrounding environment reflection image C (see FIG. 3) is removed and the floating noise D (see FIG. 3) is present.

FIG. 4B shows an implementation of the spatial image projection device according to the non-limiting example embodiment described with regard to FIG. 4A. Compared to FIG. 3B, the first polarizing film 140 (which may be composed of a linear polarizing film and a quarter wave plate) is added to the curved surface of the housing 110. The brightness of the interior may be made dark by the addition of the first polarizing film 140, but the surrounding environment reflection image C (see FIG. 3B) may disappear. Here, if the illumination device 170 (see FIG. 1) is provided inside the housing 110, the visibility of the housing 110 and the bottom portion of the housing 110 may improve, as indicated in FIG. 3B.

Figure 5:
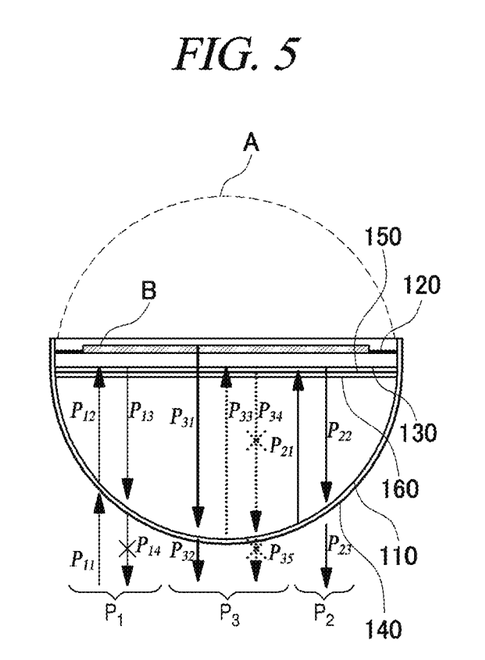
FIG. 5 is a cross-sectional view of a spatial image projection device in accordance with at least one embodiment of the present disclosure.

FIG. 5 is a cross-sectional view of a spatial image projection device in accordance with at least one other non-limiting example embodiment of the present disclosure.

According to the third embodiment, the surrounding environment reflection image C (see FIG. 3) and floating noise d (see FIG. 3) can be removed.

Referring to FIG. 5, the first polarizing film 140 is attached to the curved surface of the housing 110, and the second polarizing film 150 and the quarter wave plate 160 are disposed in front of the half-mirror 130. In accordance with the present embodiment, the first polarizing film 140 attached to the curved surface of the housing 110 may be a linear polarizing film. Further, the second polarizing film 150 disposed in front of the half-mirror 130 may be a linear polarizing film.

The paths of light in the spatial image projection device 100 and the polarization characteristics thereof are described as follows. With regard to the present embodiment, the linear polarizing film and the linear polarizing film attached to the housing 110 and the half-mirror 130, respectively, are set in a vertical direction and the quarter wave plate 160 is set at an angle of 45 degrees.

A first path $P_1$ is a path along which light $P_{11}$ of the external environment passes through the housing 110, enters into the housing 110 $P_{12}$ and is reflected from the half-mirror 130 $P_{13}$ and then exits the housing 110 $P_{14}$. The light $P_{11}$ of the external environment is unpolarized light. The light $P_{11}$ has only a vertical polarization component while passing through the first polarizing film 140, i.e., the linear polarizing film, attached to the housing 110 and then enters into the housing 110. Subsequently, the light $P_{11}$ passes through the quarter wave plate 160 and passes through the linear polarizing film with only a circular polarization component $P_{13}$. Accordingly, only the vertical polarization component of the light $P_{11}$ remains $P_{12}$. The light is reflected from the half-mirror 130 $P_{13}$ and passes through the linear polarizing film and the quarter wave plate 160 again while maintaining the polarization state. Accordingly, the light has only the circular polarization component $P_{13}$ and is directed toward the curved surface of the housing 110. The light passing through the housing 110 has only the vertical polarization component while passing through the linear polarizing film and then exits $P_{14}$. As such, the surrounding environment reflection image C comes out again, but the total amount of light decreases while passing through the first polarizing film 140, the second polarizing film 150 and the quarter wave plate 160 several times. Therefore, the visibility of the surrounding environment reflection image C is reduced.

A second path $P_2$ is a path along which light from the illumination device 170 (see FIG. 1) disposed inside the housing 110 is scattered inside the housing 110 $P_{21}$ and reflected from the half-mirror 130 $P_{22}$ and then comes out of the housing 110 $P_{23}$. If the illumination device 170 (see FIG. 1) does not have a special polarization direction, the light $P_{21}$ reflected/scattered from the housing 110 is unpolarized light and this light has only a vertical polarization component while passing through the quarter wave plate 160 and the linear polarizing film. The light $P_{22}$ reflected from the half-mirror 130 also has only a horizontal polarization component, but has a circular polarization component while passing through the linear polarizing film and the quarter wave plate 160 and is directed toward the housing 110. The light passing through the housing 110 has only the vertical polarization component while passing through the linear polarizing film and then comes out $P_{23}$. That is, since the shape of the housing 110 is reflected from the half-mirror 130, the viewer may see the cylindrical spatial image b formed by combination of the real semi-cylindrical curved surface with the semi-cylindrical curved surface reflected on the half-mirror 130.

In the present disclosure, the display unit 120 is located behind the half-mirror 130. A third path $P_3$ is a path along which the hologram image A output from the display unit 120 has a circular polarization component while passing through the half-mirror 130 $P_{31}$ with the linear polarizing film and the quarter wave plate 160 disposed on the front thereof. The light having the circular polarization component has only a vertical polarization component while passing through the housing 110 and the linear polarizing film and then exits the housing 110 $P_{32}$. Therefore, the viewer may see the hologram image A. On the other hand, the light $P_{33}$ reflected from the half-mirror 130 passes through the quarter wave plate 160 and is converted into a horizontal polarization component and thus cannot pass through the linear polarization film set in the vertical direction $P_{21}$. Therefore, the floating noise D is not generated $P_{35}$.

As a result, the viewer may see the hologram image A and the cylindrical spatial image B where the surrounding environment reflection image C is reduced and the floating noise D is removed.

Figure 6A:
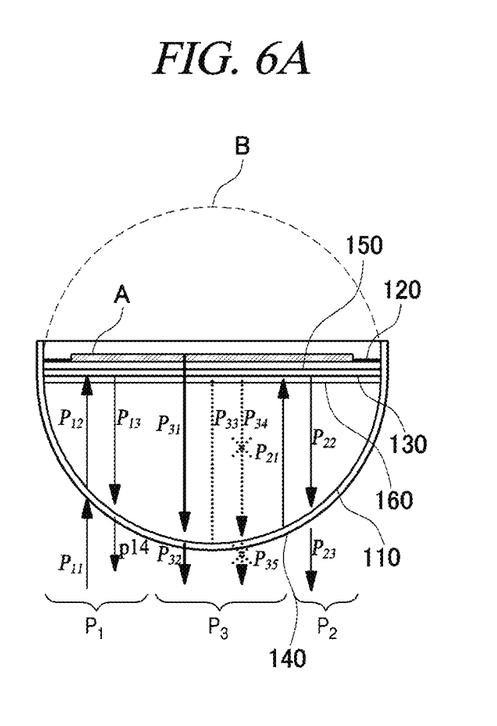
FIG. 6A is a cross-sectional view of a spatial image projection device in accordance with at least one embodiment of the present disclosure.
Figure 6B:
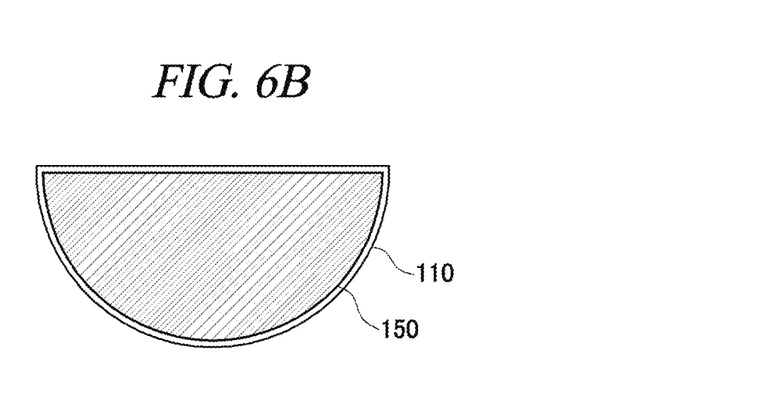
FIG. 6B is a diagram illustrating the bottom of the spatial image projection device in accordance with at least one embodiment of the present disclosure.

FIG. 6A is a cross-sectional view of a spatial image projection device in accordance with a fourth embodiment of the present disclosure, and FIG. 6B is a diagram illustrating the bottom of the spatial image projection device in accordance with the fourth embodiment of the present disclosure.

According to the fourth embodiment, the surrounding environment reflection image C (see FIG. 3) and floating noise D (see FIG. 3) can be removed.

Referring to FIG. 6A and FIG. 6B, in the spatial image projection device 100, the first polarizing film 140 is added to the housing 110, the quarter wave plate 160 is disposed in front of the half-mirror 130, and the second polarizing film 150 is disposed on the front of the display unit 120. With regard to the present non-limiting example embodiment, the first polarizing film 140 may be a circular polarizing film and the second polarizing film 150 may be a linear polarizing film. A high-speed axis of the quarter wave plate 160 and a polarization axis of the second polarizing film 150 are arranged to form an angle of 45 degrees to each other, and, thus, light output from the display unit 120 is put into a circular polarization state. Polarization formed by the second polarizing film 150 and the quarter wave plate 160 is the same as polarization of the circular polarizing film attached to the outside of the housing 110. For example, if the polarization formed by the second polarizing film 150 and the quarter wave plate 160 is left-circular polarization, the circular polarizing film may also desirably have left-circular polarization; or if the polarization formed by the second polarizing film 150 and the quarter wave plate 160 is right-circular polarization, the circular polarizing film may also desirably have right-circular polarization.

Also, if the display unit 120 has linear polarization in the same polarization axial direction as the second polarizing film 150 attached to the front thereof, the second polarizing film 150 may not be attached. For example, if the display unit 120 is a display panel having linear polarization in the vertical direction, the quarter wave plate 160 is disposed in a direction of 45 degrees and the first polarizing film 140 having a circular polarization direction is attached to the outside of the housing 110. Accordingly, it is possible to construct the spatial image projection device 100 having the same effect as the fourth embodiment of the spatial image projection device 100 according to the present disclosure.

A first path $P_1$ is a path along which light $P_{11}$ of the external environment passes through the housing 110, enters into the housing 110 $P_{12}$ and is reflected from the half-mirror 130 $P_{13}$ and then exits the housing 110 $P_{14}$. The light $P_{11}$ of the external environment is unpolarized light and is put into a circular polarization state while passing through the circular polarizing film attached to the housing 110 and then put back into a linear polarization state while passing through the quarter wave plate 160. A linear polarization direction is the same as that of the circular polarization film. The light $P_{13}$ is reflected from the surface of the half-mirror 130, passes through the quarter wave plate 160, and passes through the circular polarizing film of the housing 110 $P_{14}$. The light reflected from the half-mirror 130 has the same polarization direction as the circular polarizing film, and, thus, the light of the external environment can be seen through the film.

A second path $P_2$ is a path along which light from the illumination device 170 (see FIG. 1) disposed inside the housing 110 is reflected/scattered inside the housing 110 $P_{21}$ and reflected from the half-mirror 130 $P_{22}$ and then comes out of the housing 110 $P_{23}$. If the illumination device 170 (see FIG. 1) does not have a special polarization direction, the light $P_{21}$ reflected/scattered from the housing 110 is unpolarized light and the light reflected from the half-mirror 130 $P_{22}$ passes through the quarter wave plate 160. Since the light $P_{21}$ reflected/scattered inside the cylinder is unpolarized light, the light $P_{21}$ maintains its polarization characteristics even after passing through the quarter wave plate 160. Accordingly, the brightness difference between the light $P_{21}$ irradiated directly from the illumination device (see FIG. 1) into the housing and reflected/scattered inside the housing 110 and the light reflected from the half-mirror 130 is reduced, and, thus, a spatial image with reduced heterogeneity can be produced.

That is, the light $P_{21}$ irradiated directly from the illumination device (see FIG. 1) and reflected/scattered inside the housing 110 may be seen by the viewer's eyes as the light $P_{23}$ passing through the circular polarizing film outside the housing 110. Therefore, since the shape of the housing 110 is reflected from the half-mirror 130 and exits the housing 110, the viewer see the cylindrical spatial image B formed by combination of the real semi-cylindrical curved surface with the semi-cylindrical curved surface reflected on the half-mirror 130.

In the present disclosure, the display unit 120 is located behind the half-mirror 130. A third path $P_3$ is a path along which the image output from the display unit 120 has a circular polarization component while passing through the half-mirror 130 $P_{31}$ to which the linear polarizing film and the quarter wave plate 160 are attached. The light passing through the housing 110 is output to the outside $P_{32}$ while passing through the circular polarizing film attached to the outside of the housing 110 and having the same polarization direction. However, the light reflected from the surface of the housing 110 has a reversed polarization direction and is reflected back to the half-mirror 130 $P_{33}$ and then reflected again from the half-mirror 130 toward the housing 110 $P_{34}$. Here, the light reflected from the half-mirror 130 maintains the circular polarization direction due to the quarter wave plate 160 unlike the light reflected from the surface of the housing 110. Therefore, the light has a reversed polarization direction and thus cannot pass through the circular polarizing film attached to the housing 110.

Therefore, the floating noise d caused by the image output from the display unit 120 is not generated.

Further, referring to FIG. 6B, a circular polarizing film 150 having the same polarization direction as the circular polarizing film is disposed on the bottom portion of the housing 110 to remove a floating afterimage output to the bottom portion according to the same principle as described above. Here, a linear polarizing portion of the circular polarizing film 150 is disposed to face the bottom.

As a result, the transparent cylindrical spatial image b with reduced heterogeneity can be output, and, thus, the viewer can see the hologram image A and the spatial image b where the surrounding environment image c (see FIG. 3A and FIG. 3B) and the floating noise d (see FIG. 3A and FIG. 3B) is reduced or removed.

Figure 7:
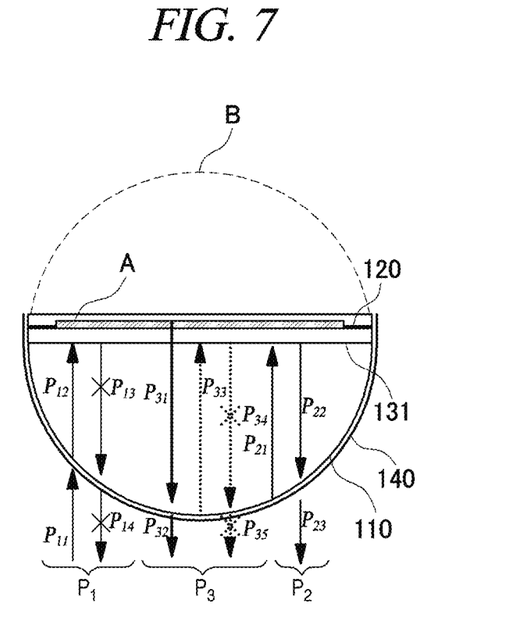
FIG. 7 is a cross-sectional view of a spatial image projection device in accordance with at least one embodiment of the present disclosure.

FIG. 7 is a cross-sectional view of a spatial image projection device in accordance with a fifth embodiment of the present disclosure.

In the fifth embodiment, the spatial image projection device 100 may use a reflective polarizing film 131 instead of the half-mirror 130 and a linear polarizing film serving as the first polarizing film 140 in order to remove ambient reflected light.

The reflective polarizing film 131 may transmit light in a specific polarization direction and reflect light in a direction perpendicular thereto.

Here, the polarization characteristics of external and internal lights when passing through/reflected from the housing 110 and the reflective polarizing film 131 are described as follows.

The paths of light in the spatial image projection device 100 is largely divided into three types. A first path $P_1$ is a path along which light $P_{11}$ of the external environment passes through the housing 110, enters into the housing 110 $P_{12}$ and is reflected from the reflective polarizing film 131 $P_{13}$ and then exits the housing 110 $P_{14}$, a second path $P_2$ is a path along which light from the illumination device 170 (see FIG. 1) disposed inside the housing 110 is reflected/scattered from the housing 110 $P_{21}$ and reflected from the reflective polarizing film 131 $P_{22}$ and then exits the housing 110 $P_{23}$, and a third path $P_3$ is a path along which light output from the display unit 120 passes through the reflective polarizing film 131 $P_{31}$ and penetrates and comes out of the housing 110 $P_{32}$. The polarization characteristics of each path are described as follows. Here, it is assumed that the reflective polarizing film 131 is configured to reflect vertically polarized light and transmit horizontally polarized light and the first polarizing film 140 is set in a horizontal direction.

In the first path $P_1$, the external light $P_{11}$ is unpolarized light. The light has only a horizontal polarization component $P_{12}$ while passing through the first polarizing film 140 and enters into the housing 110. Since the housing 110 does not affect polarization, the light is directed toward the reflective polarizing film 131 while maintaining polarization. The horizontally polarized light penetrates the reflective polarizing film 131 without being reflected. Therefore, the surrounding environment reflection image c (see FIG. 3A and FIG. 3B) of the external unpolarized light cannot come out $P_{13}$ by the first polarizing film 140 attached to the housing 110, which can be used to remove the surrounding environment reflection image c (see FIG. 3A and FIG. 3B) $P_{14}$.

In the second path $P_2$, a circular polarizing film (not shown) is provided in front of the illumination device 170 (see FIG. 1) to use polarization characteristics. In the second path $P_2$, light output from the illumination device 170 (see FIG. 1) provided inside the housing 110 is reflected/scattered inside the housing 110 and directed in various directions $P_{21}$. A part of the light is directed toward the reflective polarizing film 131 and has circular polarization characteristics. Therefore, it is reflected $P_{22}$ as it is and exits. Here, since the first polarizing film 140 set in the horizontal direction is attached to the front of the housing 110, the reflected light $P_{22}$ having circular polarization characteristics exits the housing 110. That is, since the shape of the housing 110 is reflected from the reflective polarizing film 131 and exits, the viewer may see the cylindrical spatial image B formed by combination of the real semi-cylindrical curved surface with the semi-cylindrical curved surface reflected on the reflective polarizing film 131.

In the present disclosure, the display unit 120 is located behind the reflective polarizing film 131. In the third path $P_3$, the hologram image A output from the display 120 passes through the reflective polarizing film 131 $P_{31}$ and has only horizontal polarization characteristics and then passes through the first polarizing film 140 $P_{32}$ and exits the housing 110 so that the viewer can see the hologram image A. Here, a part of the light is reflected from the inner surface of the housing 110 and directed again to the reflective polarizing film 131 $P_{33}$. Since the light directed to the reflective polarizing film 131 has only horizontal polarization characteristics, it can only pass through the reflective polarizing film 131 and cannot be reflected again $P_{34}$.

Therefore, the floating noise d (see FIG. 3A and FIG. 3B) where a noise image is projected onto the space is not generated.

As a result, the surrounding environment reflection image c (see FIG. 3A and FIG. 3B) and the floating noise d (see FIG. 3A and FIG. 3B) can be removed regardless of the cylindrical spatial image b. Therefore, the viewer can see the hologram image A and the spatial image B where the surrounding environment reflection image c (see FIG. 3A and FIG. 3B) and the floating noise d (see FIG. 3A and FIG. 3B) are removed.

The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include computer storage medium. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A spatial image projection device, comprising:
    a housing having a semi-cylindrical curved surface and being made of a transparent material;
    a display unit, disposed in the housing, configured to output a hologram image toward the semi-cylindrical curved surface of the housing;
    a half-mirror, disposed on a front of the display unit, configured to form a reflection image of the semi-cylindrical curved surface and to project a cylindrical spatial image corresponding to the hologram image inside the housing;
    a first polarizing film, attached to an outer surface of the semi-cylindrical curved surface, configured to block light directed from the housing towards a viewer;
    a second polarizing film inwardly positioned from an inner surface of the semi-cylindrical curved surface at a front of the half-mirror; and
    a quarter-wave plate that is disposed on a front of the second polarizing film.

2. The spatial image projection device of claim 1, wherein the cylindrical spatial image is projected to a space between the half-mirror and the curved surface of the semi-cylindrical housing.

3. The spatial image projection device of claim 1, wherein the first polarizing film is a circular polarizing film.

4. The spatial image projection device of claim 1, wherein the first polarizing film is a linear polarizing film.

5. The spatial image projection device of claim 1, further comprising:
an illumination device that is disposed inside the housing.

* * * * *